United States Patent
Nguyen et al.

(10) Patent No.: US 10,872,625 B1
(45) Date of Patent: Dec. 22, 2020

(54) HELICAL COILS DESIGN AND PROCESS FOR DUAL WRITER MAGNETIC RECORDING

(71) Applicant: Western Digital Technologies, Inc., San Jose, CA (US)

(72) Inventors: Thao A. Nguyen, San Jose, CA (US); Michael Kuok San Ho, Redwood City, CA (US); Zhigang Bai, Fremont, CA (US); Zhanjie Li, Pleasanton, CA (US); Quang Le, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/691,316

(22) Filed: Nov. 21, 2019

(51) Int. Cl.
*G11B 5/17* (2006.01)

(52) U.S. Cl.
CPC ..................... *G11B 5/17* (2013.01)

(58) Field of Classification Search
CPC ....... G11B 5/1278; G11B 5/17; G11B 5/3116; G11B 5/3123; G11B 5/235; G11B 5/23; G11B 5/315; G11B 5/3146; G11B 5/147; G11B 2005/0024
See application file for complete search history.

(56) References Cited

U.S. PATENT DOCUMENTS

| | | |
|---|---|---|
| 3,921,219 A | 11/1975 | Lalesse |
| 5,285,341 A | 2/1994 | Suzuki et al. |
| 5,703,740 A | 12/1997 | Cohen et al. |
| 5,801,379 A | 9/1998 | Kouznetsov |
| 5,835,313 A * | 11/1998 | Sato ...................... G11B 5/3109 360/317 |
| 5,883,760 A * | 3/1999 | Yamada ............. G11B 5/00826 360/291 |

(Continued)

FOREIGN PATENT DOCUMENTS

| | | |
|---|---|---|
| JP | S61227209 A | 10/1986 |
| JP | 4043438 B2 | 2/2008 |

(Continued)

OTHER PUBLICATIONS

U.S. Appl. No. 16/453,991, filed Jun. 26, 2019.

(Continued)

*Primary Examiner* — Brian E Miller
(74) *Attorney, Agent, or Firm* — Patterson & Sheridan, LLP; Steven Versteeg (57) ABSTRACT

The present disclosure generally relates to a magnetic media drive employing a magnetic recording head. The magnetic recording head comprises a first write head disposed adjacent to a second write head. The first write head comprises a first main pole coupled to a first yoke having a first length. The second write head comprises a second main pole coupled to a second yoke having a second length that is less than the first length of the first yoke. A first coil is wrapped around the first yoke, and a second coil is wrapped around the second yoke. The first coil is wrapped around the first yoke a greater number of times than the second coil is wrapped around the second yoke. Both the first and second coils comprise first portions comprised of a first material and second portions comprised of a second material different than the first material.

24 Claims, 10 Drawing Sheets

(56) References Cited

U.S. PATENT DOCUMENTS

| | | |
|---|---|---|
| 7,116,516 B2 | 10/2006 | Dill et al. |
| 7,430,098 B1 | 9/2008 | Song et al. |
| 7,508,619 B2 | 3/2009 | Okamoto et al. |
| 7,576,951 B2 | 8/2009 | Allen et al. |
| 7,889,456 B2 | 2/2011 | Jiang et al. |
| 7,982,996 B2 | 7/2011 | Smith et al. |
| 8,116,031 B2 | 2/2012 | Alex et al. |
| 8,310,782 B2 | 11/2012 | Song et al. |
| 8,472,135 B1 | 6/2013 | Kusukawa et al. |
| 8,634,163 B2 | 1/2014 | Tanabe et al. |
| 8,848,317 B2 | 9/2014 | Shiimoto et al. |
| 8,947,807 B2* | 2/2015 | Heim ................ G11B 5/3123 360/46 |
| 8,970,966 B2 | 3/2015 | Maetaki |
| 9,355,655 B1 | 5/2016 | Udo et al. |
| 9,583,134 B2 | 2/2017 | Yamada et al. |
| 9,626,990 B2 | 4/2017 | Tang et al. |
| 9,640,205 B1 | 5/2017 | Kaizu et al. |
| 9,773,517 B2 | 9/2017 | Gao et al. |
| 9,805,744 B1 | 10/2017 | Xue et al. |
| 9,842,614 B2 | 12/2017 | Hutchinson et al. |
| 9,865,301 B1 | 1/2018 | Wiesen et al. |
| 9,984,707 B2 | 5/2018 | Moore et al. |
| 10,014,012 B1 | 7/2018 | Song et al. |
| 10,157,632 B1 | 12/2018 | Song et al. |
| 10,181,334 B1 | 1/2019 | Song et al. |
| 10,210,888 B1 | 2/2019 | Li et al. |
| 10,210,891 B1 | 2/2019 | Tian et al. |
| 10,279,451 B1 | 5/2019 | Liu et al. |
| 10,311,900 B1 | 6/2019 | Liu et al. |
| 10,325,618 B1 | 6/2019 | Wu et al. |
| 10,325,619 B2 | 6/2019 | Wiesen et al. |
| 10,360,935 B1 | 7/2019 | Liu et al. |
| 10,366,713 B1 | 7/2019 | Tang et al. |
| 10,366,714 B1 | 7/2019 | Olson et al. |
| 10,403,309 B2 | 9/2019 | Li et al. |
| 10,410,658 B1 | 9/2019 | Liu et al. |
| 10,418,054 B1 | 9/2019 | Liu |
| 10,482,905 B2 | 11/2019 | Liu et al. |
| 10,650,847 B2 | 5/2020 | Li et al. |
| 2004/0100731 A1* | 5/2004 | Sato ................ B82Y 25/00 360/123.61 |
| 2004/0218306 A1* | 11/2004 | Sato ................ B82Y 10/00 360/123.41 |
| 2004/0246622 A1* | 12/2004 | Sato ................ G11B 5/3133 360/123.39 |
| 2006/0126221 A1 | 6/2006 | Kobayashi et al. |
| 2007/0041119 A1* | 2/2007 | Matsumoto ......... G11B 7/1387 360/59 |
| 2007/0258167 A1 | 11/2007 | Allen et al. |
| 2007/0291409 A1* | 12/2007 | Sasaki ................ G11B 5/3163 360/125.02 |
| 2008/0186628 A1* | 8/2008 | Hsiao ................ G11B 5/1278 360/234.6 |
| 2009/0034121 A1* | 2/2009 | Ohta ................ G11B 5/3123 360/125.02 |
| 2009/0251821 A1* | 10/2009 | Song ................ G11B 5/6064 360/110 |
| 2010/0007992 A1 | 1/2010 | Yamada et al. |
| 2011/0051288 A1 | 3/2011 | Contreras et al. |
| 2011/0205861 A1 | 8/2011 | Erden et al. |
| 2012/0162821 A1 | 6/2012 | Lam et al. |
| 2013/0170060 A1 | 7/2013 | Johns et al. |
| 2014/0153134 A1 | 6/2014 | Han et al. |
| 2016/0035374 A1 | 2/2016 | Takagishi et al. |
| 2016/0148629 A1* | 5/2016 | Gao ................ G11B 5/3116 360/64 |
| 2016/0148636 A1 | 5/2016 | Ma et al. |
| 2017/0076742 A1 | 3/2017 | Tang et al. |
| 2018/0082714 A1* | 3/2018 | Wiesen ................ G11B 27/36 |
| 2019/0244634 A1 | 8/2019 | Goncharov et al. |
| 2019/0279663 A1 | 9/2019 | Song et al. |
| 2019/0279664 A1 | 9/2019 | Liu |
| 2019/0304490 A1 | 10/2019 | Liu et al. |
| 2019/0333531 A1 | 10/2019 | Liu et al. |

FOREIGN PATENT DOCUMENTS

| | | |
|---|---|---|
| JP | 2010108533 A | 5/2010 |
| JP | 6145124 B2 | 6/2017 |

OTHER PUBLICATIONS

U.S. Appl. No. 16/015,163, filed Jun. 21, 2018.

Zhu et al. "Microwave Assisted Magnetic Recording Utilizing Perpendicular Spin Torque Oscillator with Switchable Perpendicular Electrodes," IEEE Transactions on Magnetics, vol. 46, No. 3, Mar. 2000, pp. 751-757.

Akitaya et al. "High Frequency Magnetic Recording Using a Dual Write Head," IEEE Transactions on Magnetics, vol. 52, No. 7, Jul. 2016, DOI: 10.1109/TMAG.2015.2512593 <https://doi.org/10.1109/TMAG.2015.2512593>.

International Search Report issued in corresponding International Patent Application No. PCT/US2020/023679, dated Aug. 14, 2020 (12 pages).

International Search Report and Written Opinion issued in corresponding Interntional Patent Application No. PCT/US2020/023596, dated Aug. 14, 2020 (14 pages).

International Search Report and the Written Opinion for International Patent Application No. PCT/US2020/034721 dated Aug. 16, 2020, 11 pages.

\* cited by examiner

HELICAL COILS DESIGN AND PROCESS FOR DUAL WRITER MAGNETIC RECORDING

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, various magnetic recording methods have been studied to improve the areal density of a magnetic media device, such as a hard disk drive (HDD). Magnetic recording heads in HDDs can have a significant effect on the overall performance and reliability of the recording device. Magnetic recording heads may be designed to achieve specific advantages, such as improved performance, but may consequently have a negative impact on other characteristics, such as decreased reliability.

Conventional HDD systems utilize one write head per disk surface. The areal recording density is determined by the product of linear density (or bit per inch (BPI)) and track density (or track per inch (TPI)). There is typically a design tradeoff for the write head between BPI and TPI capability. For instance, to achieve high BPI, the write head needs to be made "stronger" (i.e., able to deliver a large amount of magnetic field to the media by, for example, using large number of coil turns). However, delivering a large amount of magnetic field to the media is usually accompanied by the leakage of field to the adjacent tracks, causing adjacent track interference, and therefore hurting the TPI capability.

On the other hand, the leakage field on the adjacent tracks is also dependent on the data rate. Generally, the higher the data rate, the more leakage of the field due to the dynamic effects of the magnetization in the shields of the write head. A write head having a high data rate capability (e.g., a write head having a very short yoke, and thus, a small number of coil turns) requires less driving currents in the write coil, which will reduce the side field leakage, thus benefiting TPI. However, such design optimizations cannot be achieved simultaneously on the same write head.

Therefore, there is a need in the art for an improved magnetic recording head design.

SUMMARY OF THE DISCLOSURE

The present disclosure generally relates to a magnetic media drive employing a magnetic recording head. The magnetic recording head comprises a first write head disposed adjacent to a second write head. The first write head comprises a first main pole coupled to a first yoke having a first length. The second write head comprises a second main pole coupled to a second yoke having a second length that is less than the first length of the first yoke. A first coil is wrapped around the first yoke, and a second coil is wrapped around the second yoke. The first coil is wrapped around the first yoke a greater number of times than the second coil is wrapped around the second yoke. Both the first and second coils comprise first portions comprised of a first material and second portions comprised of a second material different than the first material.

In one embodiment, a magnetic recording head comprises a first write head comprising a first main pole, a first yoke coupled to the first main pole, and a first coil wrapped around the first yoke, wherein each wrap of the first coil comprises first portions comprised of a first material and second portions comprised of a second material different than the first material. The magnetic recording head further comprises a second write head disposed adjacent to the first write head comprising a second main pole, a second yoke coupled to the second main pole, and a second coil wrapped around the second yoke, wherein each wrap of the second coil comprises first portions comprised of the first material and second portions comprised of the second material.

In another embodiment, a magnetic recording head comprises a first write head comprising a first main pole, a first yoke coupled to the first main pole, the first yoke having a first length, and a first coil wrapped around the first yoke, the first coil having a second length. The magnetic recording head further comprises a second write head disposed adjacent to the first write head comprising a second main pole, a second yoke coupled to the second main pole, the second yoke having a third length less than the first length of the first yoke, and a second coil, the second coil having a fourth length less than the second length of the first coil, wherein the first coil wraps around the first yoke a greater number of times than the second coil wraps around the second yoke.

In another embodiment, a magnetic recording head comprises one or more read heads, a first write head comprising means for increasing a bits per inch capability of the magnetic recording head and means for increasing a write field, and a second write head disposed adjacent to the first write head, the second write head comprising means for increasing a tracks per inch capability of the magnetic recording head and means for increasing a data rate capability. The first write head has a higher bit per inch capability and a greater write field than the second write head, and the second write head has a higher tracks per inch capability and a higher data rate capability than the first write head.

In yet another embodiment, a method of forming a write head comprises forming one or more bottom coil bars over a substrate, the one or more coil bars comprising a first material, depositing a first photoresist over ends of each of the one or more bottom coil bars for formation of a plurality of coil pillars, depositing a first insulating layer over the one or more bottom coil bars and the substrate, removing the first photoresist to expose the ends of each of the one or more bottom coil bars, forming a yoke over a central portion of the one or more bottom coil bars and form the plurality of coil pillars on the exposed ends of each of the one or more bottom coil bars, the plurality of coil pillars comprising a second material different than the first material, depositing a second insulating layer over the yoke and the plurality of coil pillars, removing portions of the second insulating layer to expose an end of each of the plurality of coil pillars, forming a write pole, and forming one or more top coil bars over the second insulating layer, the one or more top coil bars comprising the first material, wherein each top coil bar connects with a first exposed end of one coil pillar and a second exposed end of another coil pillar unaligned with the first exposed end, and wherein the one or more top coil bars are disposed at about a 30 to 60 degree angle from the one or more bottom coil bars.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic media drive employing a magnetic recording head. The magnetic recording head comprises a first write head disposed adjacent to a second write head. The first write head comprises a first main pole coupled to a first yoke having a first length. The second write head comprises a second main pole coupled to a second yoke having a second length that is less than the first length of the first yoke. A first coil is wrapped around the first yoke, and a second coil is wrapped around the second yoke. The first coil is wrapped around the first yoke a greater number of times than the second coil is wrapped around the second yoke. Both the first and second coils comprise first portions comprised of a first material and second portions comprised of a second material different than the first material.

Figure 1:
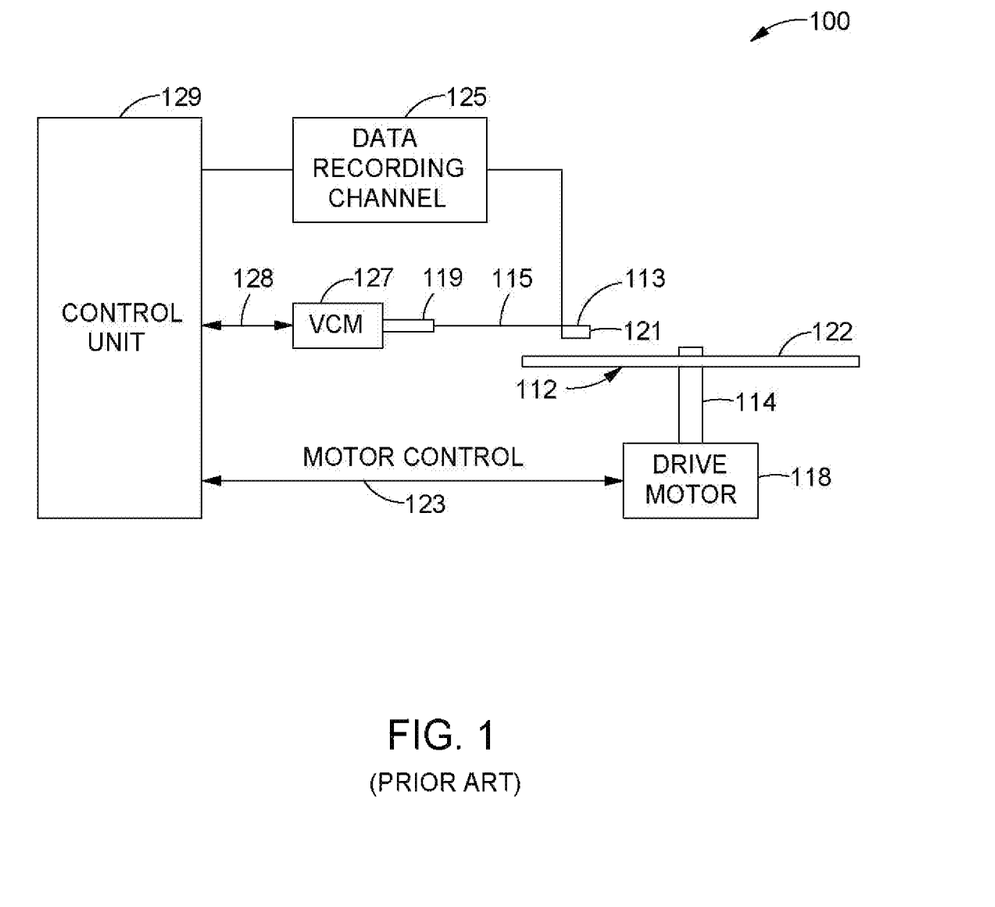
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. The magnetic field generated from the magnetic head assembly 121 will magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2A:
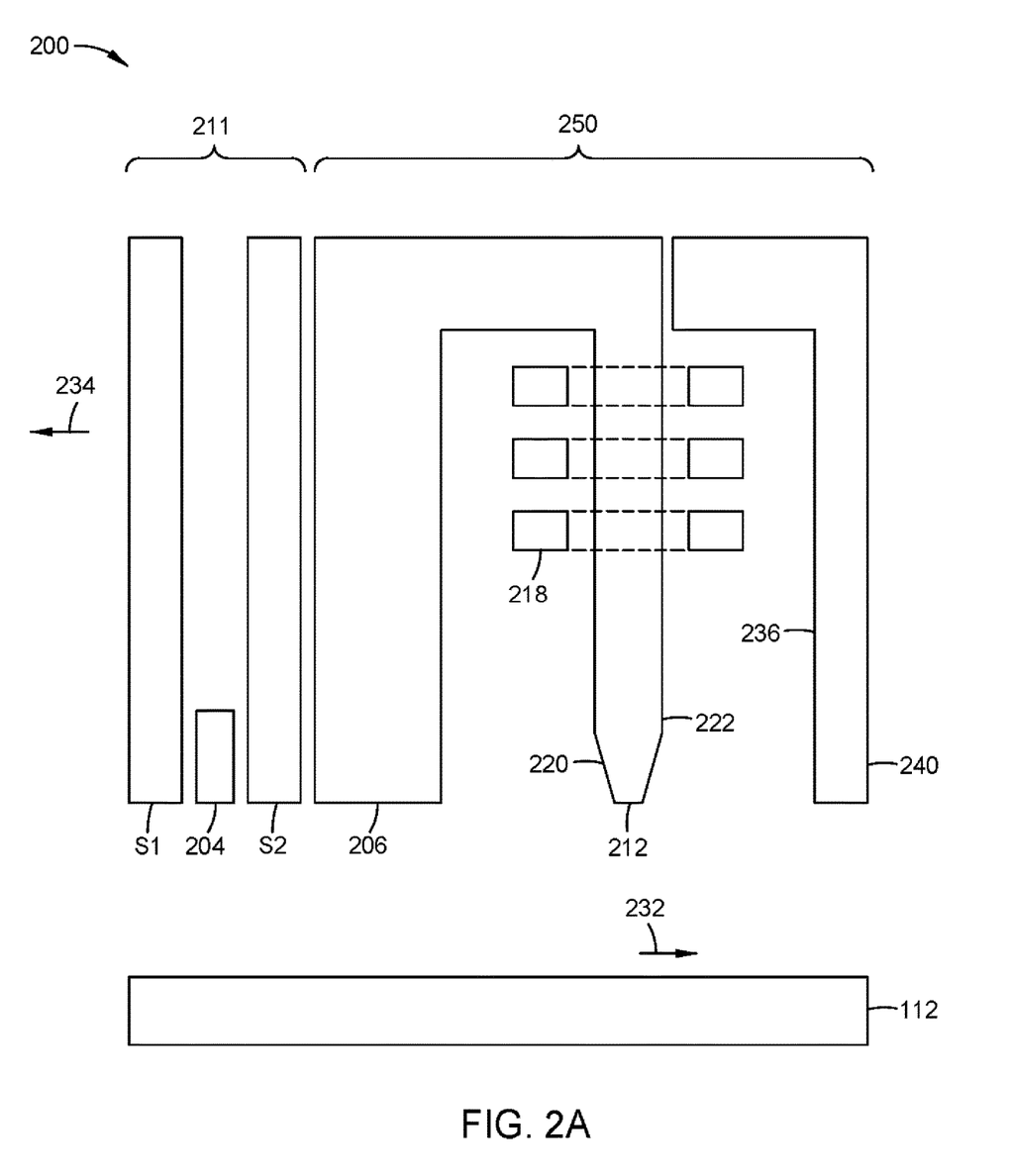
FIGS. 2A-2B illustrate fragmented, cross-sectional side views through the center of a read/write head facing a magnetic media, according to various embodiments.
Figure 2B:
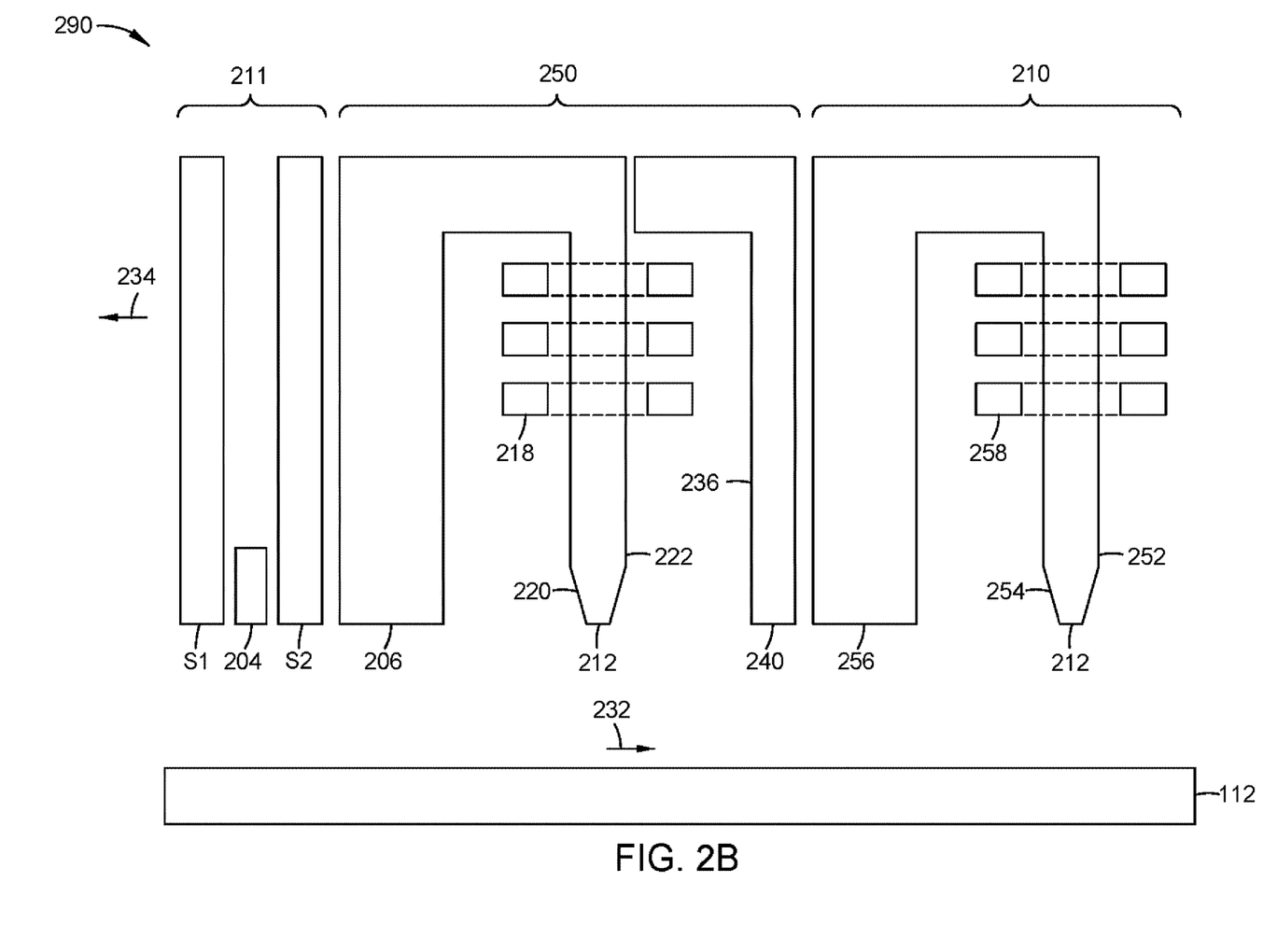

FIGS. 2A-2B illustrate fragmented, cross sectional side views through the center of read/write heads 200, 290, facing the magnetic media 112, respectively, according to various embodiments. The read/write heads 200, 290 may each correspond to the magnetic head assembly 121 described in FIG. 1. The read/write head 200 of FIG. 2A and the read/write head 290 of FIG. 2B are the same; however, the read/write head 200 of FIG. 2A comprises only one write head 250 while the read/write head 290 of FIG. 2B comprises two write heads 210, 250. The read/write head 200 of FIG. 2A may optionally include another write head 210 disposed behind the write head 250, hidden from view.

The read/write head 200 of FIG. 2A includes a media facing surface (MFS) 212, such as an air bearing surface (ABS), a magnetic write head 250, and a magnetic read head 211, and is mounted such that the MFS 212 is facing the magnetic media 112. The read/write head 290 of FIG. 2B similarly includes a MFS 212, such as an ABS, a first magnetic write head 210, a second magnetic write head 250, and a magnetic read head 211, and is mounted such that the MFS 212 is facing the magnetic media 112. The write head 250 of FIG. 2A is the same as the second write head 250 of FIG. 2B. The read/write heads 200, 290 may each be an energy-assisted magnetic recording (EAMR) head. In FIGS. 2A-2B, the magnetic media 112 moves past the first and/or second write heads 210, 250 in the direction indicated by the arrow 232 and the read/write heads 200, 290 each move in the direction indicated by the arrow 234. It is noted that, in various embodiments, the two write heads may be arranged in a different configuration than this down-track setup.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The first write head 210 of FIG. 2B includes a return pole 256, a first main pole 254, and a first coil 258 that excites the first main pole 254. The second write head 250 of FIGS. 2A-2B includes a return pole 206, a second main pole 220, a trailing shield 240, and a second coil 218 that excites the second main pole 220. A trailing gap (not shown) and a leading gap (not shown) may be in contact with at least the second main pole 220 of the second write head 250 and a leading shield (not shown) may be in contact with the leading gap. A recording magnetic field is generated from the first and/or second main poles 220, 254. The trailing shield 240 of the second write head 250 helps make the magnetic field gradient of the second main pole 220 steep. The second main pole 220 may include a trailing surface 222 which may be parallel to a leading surface 236 of the trailing shield 240. The first main pole 254 may also include a trailing surface 252. The trailing shield 240 may be a magnetic material such as NiFe alloy. In one embodiment, the trailing shield 240 has an Ms of about 1.2 T to about 1.6 T.

The first and/or second main poles 220, 254 may each comprise a magnetic material such as an FeCo alloy. The first and/or second main poles 220, 254 may each be a tapered write pole (TWP) with a trailing edge taper (TET) configuration. In one embodiment, the first and/or second main poles 220, 254 each have a saturated magnetization (Ms) of 2.4 T and a thickness between about 300 nanometers (nm). Each main pole 220, 254 may comprise ferromagnetic materials, typically alloys of one or more of Co, Fe, and Ni.

Figure 3A:
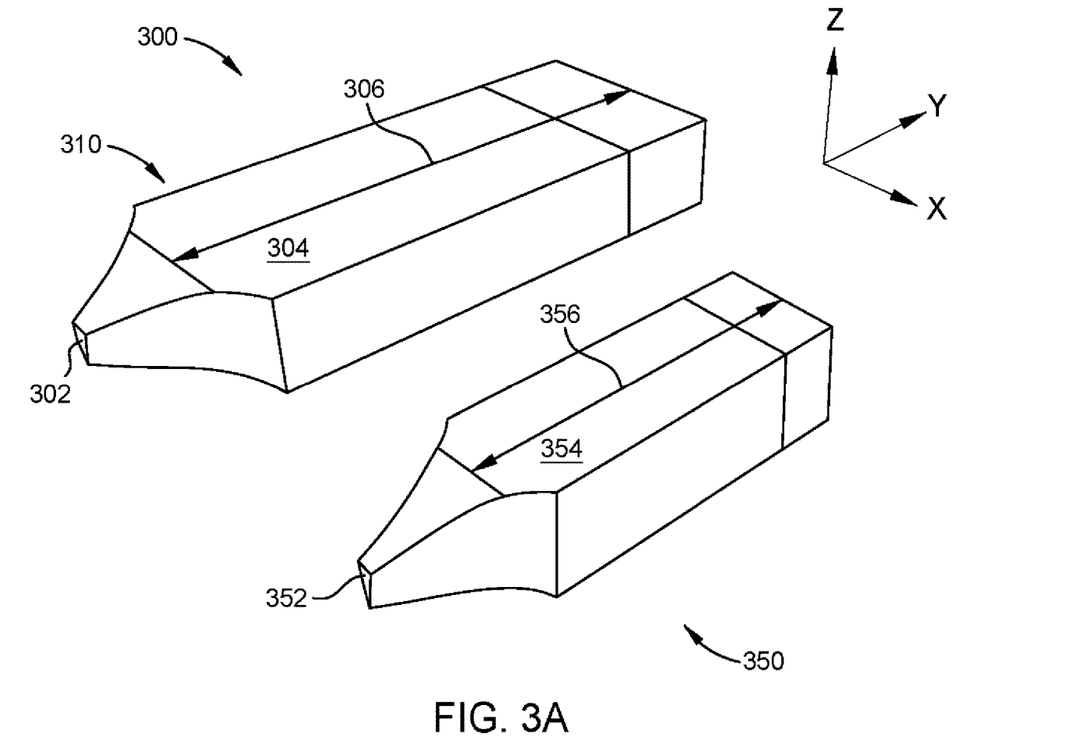
FIGS. 3A-3C illustrate a magnetic recording head comprising a first write head and a second write head, according to various embodiments.
Figure 3B:
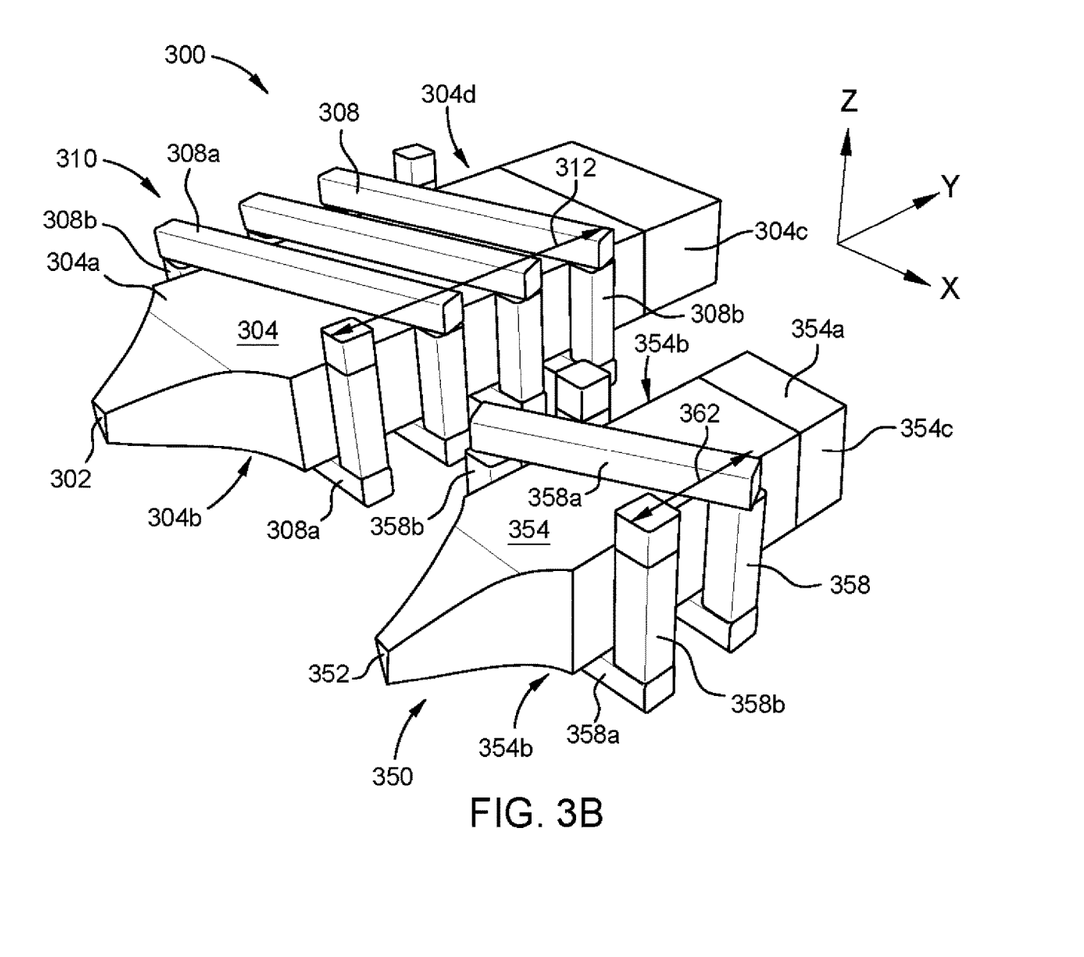
Figure 3C:
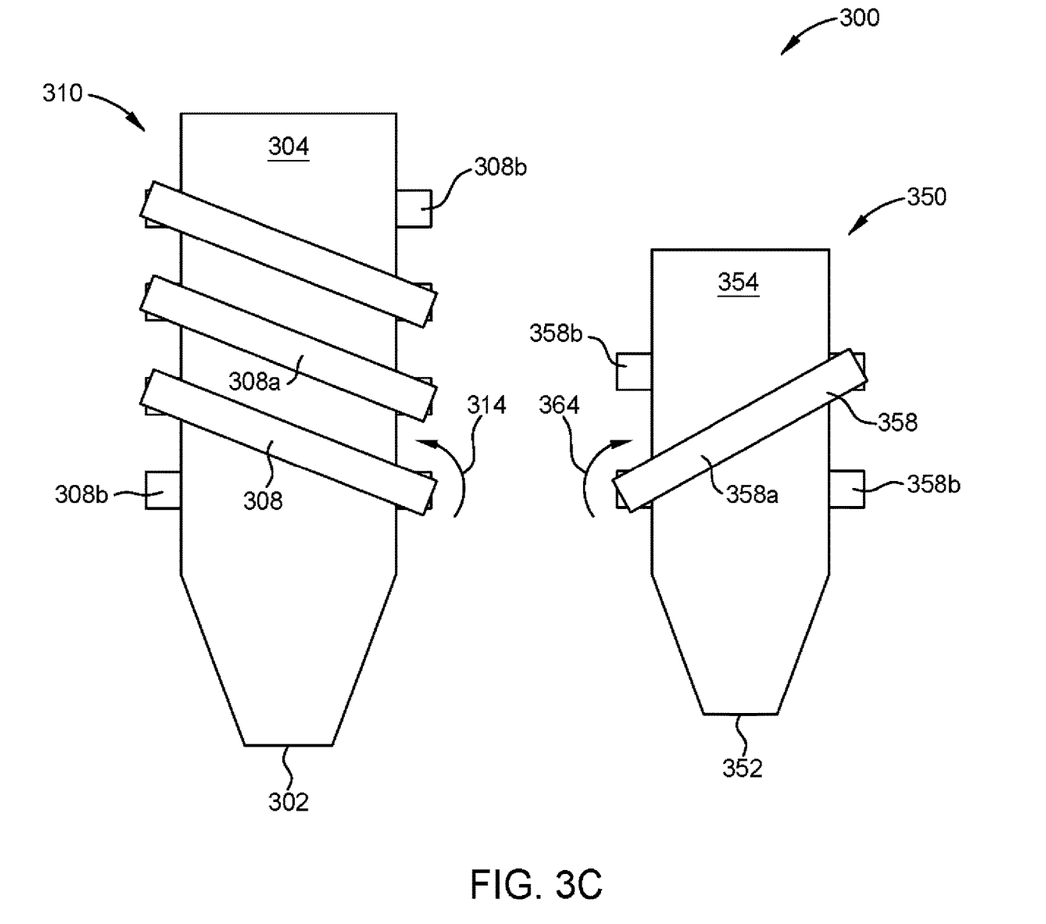

FIG. 3A-3B illustrate a perspective view of a magnetic recording head 300 comprising a first write head 310 and a second write head 350, according to various embodiments. FIG. 3C illustrates a top view of the magnetic recording head 300, according to one embodiment. The magnetic recording head 300 of FIGS. 3A-3C may be used in the disk drive 100 of FIG. 1 and/or the read/write heads 200, 290 of FIGS. 2A-2B. Similarly, the first write head 310 may be the first write head 210 of FIGS. 2A-2B and the second write head 350 may be the second write head 250 of FIGS. 2A-2B.

In one embodiment, the first write head 310 is adjacent to the second write head 350 in the cross-track direction (i.e., the y-direction) such that the first and second write heads 310, 350 are disposed side-by-side, like shown in FIGS. 3A-3B. In another embodiment, the first write head 310 is vertically aligned with the second write head 350 such that the first write head 310 is stacked on or over the second write head 350 (i.e., aligned in the z-direction). In other words, a center axis of a first main pole 302 of the first write head 310 is linearly aligned with a center axis of a second main pole 352 of the second write head 350. Thus, the first and second write heads 310, 350 may be disposed in a side-by-side formation or in a stacked formation.

The first write head 310 comprises a first main pole 302 coupled to a first yoke 304 and the second write head 350 comprises a second main pole 352 coupled to a second yoke 354. The first yoke 304 has a first length 306 that is greater than a second length 356 of the second yoke 354, as shown in FIG. 3A. A first coil 308 is wrapped around the first yoke 304 and a second coil 358 is wrapped around the second yoke 354, as shown in FIG. 3B. The first coil 308 has a first length 312 that is greater than a second length 362 of the second coil 358. Thus, the first coil 308 wraps around the first yoke 304 more times than the second coil 358 wraps around the second yoke 354. For example, as shown in FIG. 3B, the first coil 308 wraps around the first yoke 304 about four times while the second coil 358 wraps around the second yoke 354 about twice. However, the first and second coils 308, 358 may wrap around the first and second yokes 304, 354, respectively, any number of times, and the number of wraps of the first and second coils 308, 358 are not intended to be limiting.

Moreover, the first coil 308 may wrap around the first yoke 304 in either the same direction or the opposite direction as the second coil 358 wraps around the second yoke 354, as shown in FIGS. 3B-3C. In one embodiment, the first coil 308 wraps around the first yoke 304 in a clockwise direction and the second coil 358 wraps around the second yoke 354 in the clockwise direction as well, like shown in FIG. 3B. In another embodiment, the first coil 308 wraps around the first yoke 304 in a counter-clockwise direction and the second coil 358 wraps around the second yoke 354 in the counter-clockwise direction as well. In yet another embodiment, the first coil 308 wraps around the first yoke 304 in the clockwise direction and the second coil 358 wraps around the second yoke 354 in the counter-clockwise direction. In another embodiment, the first coil 308 wraps around the first yoke 304 in the counter-clockwise direction (shown by arrow 314) and the second coil 358 wraps around the second yoke 354 in the clockwise direction (shown by arrow 364), like shown in FIG. 3C.

The first yoke 304 has a rectangular shape, where a first surface 304a and a second surface 304b (not shown in the perspective view) parallel to the first surface 304a have a greater length (i.e., the x-direction) and width (i.e., the y-direction) than a third surface 304c and a fourth surface 304d (not shown in the perspective view) parallel to the third surface 304c. The first coil 308 comprises first portions 308a comprised of a first material and second portions 308b comprised of a second material different than the first material. The first portions 308a of the first coil 308 are disposed adjacent to the first and second surfaces 304a, 304b of the first yoke 304, and the second portions 308b of the first coil 308 are disposed on the third and fourth surfaces 304c, 304d of the first yoke 304. Thus, each wrap of the first coil 308 comprises first portions 308a comprised of a first material and second portions 308b comprised of a second material different than the first material.

Additionally, the first portions 308a of the first coil 308 may be spaced from the first and second surfaces 304a, 304b of the first yoke 304 while the second portions 308b of the first coil 308 may be directly coupled to the third and fourth surfaces 304c, 304d of the first yoke 304. Thus, the second portions 308b of the first coil 308 may be considered part of the first yoke 304 (i.e., flares coming off of the first yoke 304). The method of forming the first coil 308 and the first yoke 304 is described below with reference to FIG. 4 and FIGS. 5A-5H.

Similarly, the second yoke 354 has a rectangular shape, where a first surface 354a and a second surface 354b (not shown in the perspective view) parallel to the first surface 354a have a greater length (i.e., the x-direction) and width (i.e., the y-direction) than a third surface 354c and a fourth surface 354d (not shown in the perspective view) parallel to the third surface 354c. The second coil 358 comprises first portions 358a comprised of a first material and second portions 358b comprised of a second material different than the first material. The first portions 358a of the second coil 358 are disposed adjacent to the first and second surfaces 354a, 354b of the second yoke 354, and the second portions 358b of the second coil 358 are disposed on the third and fourth surfaces 354c, 354d of the second yoke 354. Thus, each wrap of the second coil 358 comprises first portions 358a comprised of the first material and second portions 358b comprised of the second material different than the first material.

Additionally, the first portions 358a of the second coil 358 may be spaced from the first and second surfaces 354a, 354b of the second yoke 354 while the second portions 358b of the second coil 358 may be directly coupled to the third and fourth surfaces 354c, 354d of the second yoke 354. Thus, the second portions 358b of the second coil 358 may be considered part of the second yoke 354 (i.e., flares coming off the second yoke 354). The method of forming the second coil 358 and the second yoke 354 is described below with reference to FIG. 4 and FIGS. 5A-5H.

In one embodiment, the first material of the first coil 308 is the same as the first material of the second coil 358, and the second material of the first coil 308 is the same as the second material of the second coil 358. The first material is a non-magnetic electrically conductive material, such as copper (Cu), and the second material is a magnetic material, such as nickel-iron or nickel-iron alloy (NiFe). The first and second yokes 304, 354 each comprises the same second material as the second portions 308b, 358b of the first and second coils 308, 358. Thus, the first and second yokes 304, 354 each comprises a magnetic material, such as NiFe.

Because the first yoke 304 has a greater length than the second yoke 354, and because the first coil 308 wraps around the first yoke 304 more times than the second coil 358 wraps around the second yoke 354, the first write head 310 has a greater write field and a slower data rate than the second write head 350. As such, the first write head 310 is optimized to increase a BPI capability of the magnetic recording head 300, more than the extent of the second head 350, for example. Similarly, because the second yoke 354 has a shorter length than the first yoke 304, and because the second coil 358 wraps around the second yoke 354 less times than the first coil 308 wraps around the first yoke 304, the second write head 350 has a higher data rate and a smaller write field than the first write head 310. As such, the second write head 350 is optimized to increase a TPI capability of the magnetic recording head 300, more than the extent of the first head 310, for example.

Figure 4:
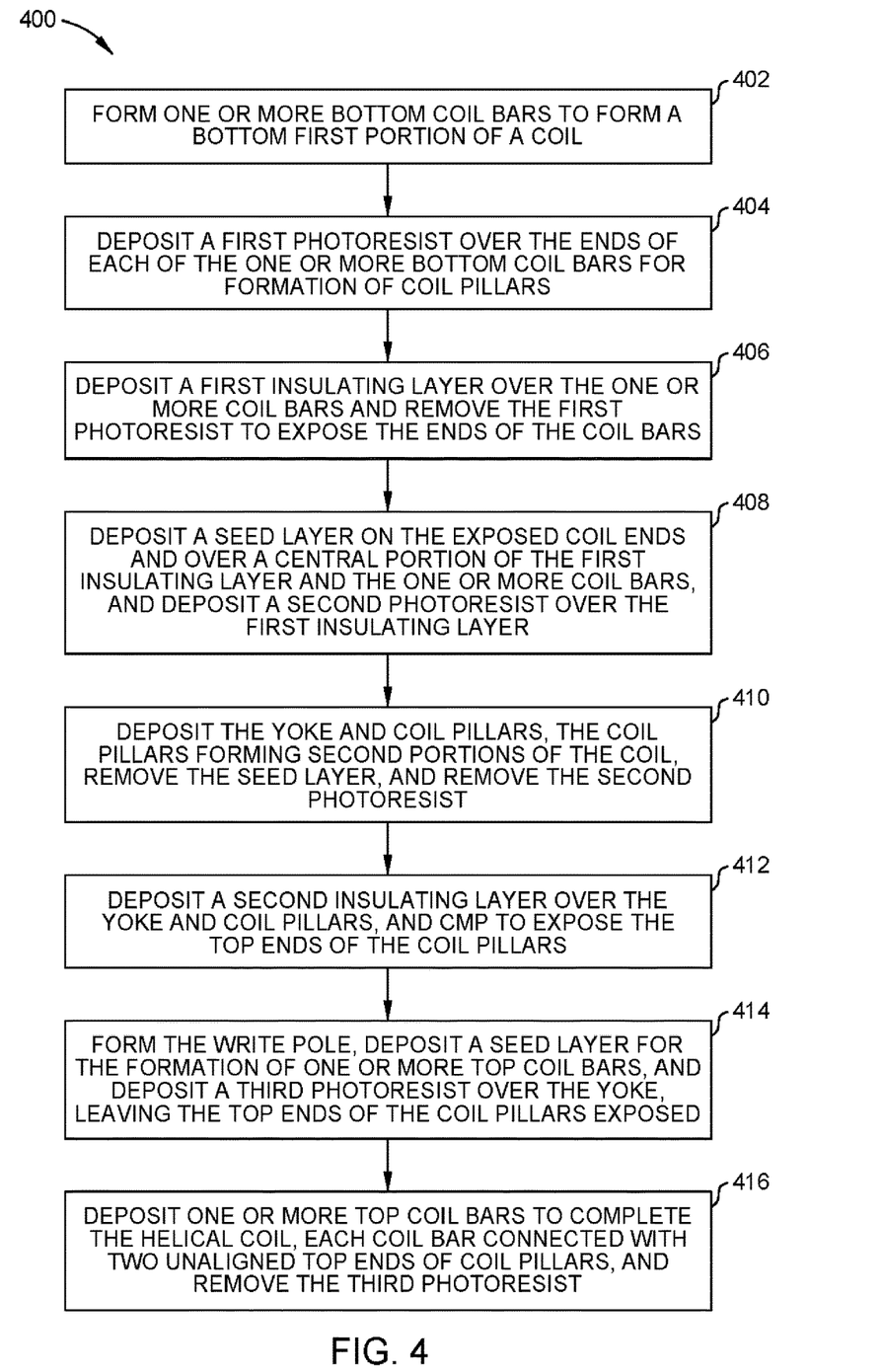
FIG. 4 illustrates a method of forming a write head having a helical coil comprising different materials wrapped around a yoke, according to one embodiment.

FIG. 4 illustrates a method 400 of forming a write head having a coil comprising different materials wrapped around a yoke, according to one embodiment. FIGS. 5A-5H illustrate a write head 500 in various stages of formation. For clarity, method 400 will be described with reference to the write head 500 of FIGS. 5A-5H as an example. While method 400 and FIGS. 5A-5H describe and illustrate forming one write head, multiple write heads may be formed simultaneously using method 400, such as the first and second write heads 310, 350 of FIGS. 3A-3B.

Figure 5A:
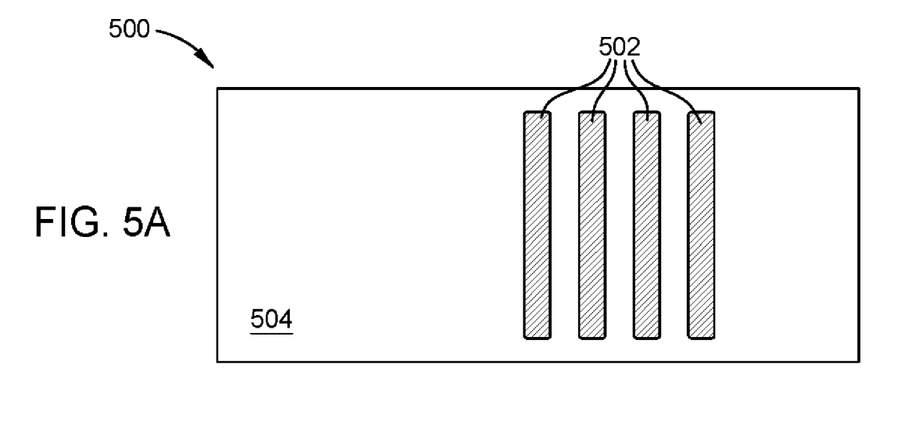
FIGS. 5A-5H illustrate a write head in various stages of formation.

In operation 402, one or more bottom coil bars 502 are formed over a substrate 504 to form a bottom first portion of the coil, as shown in FIG. 5A. The bottom first portion may be the bottom first portion 308a of the first coil 308 or the bottom first portion 358a of the second coil 358 of FIG. 3B. Forming the bottom coil bars 502 may comprise depositing a seed layer (not shown) where the bottom coil bars 502 will be formed, depositing a photoresist (not shown) around the seed layer, copper plating the bottom coil bars 502, removing the photoresist, and removing the seed layer.

Figure 5B:
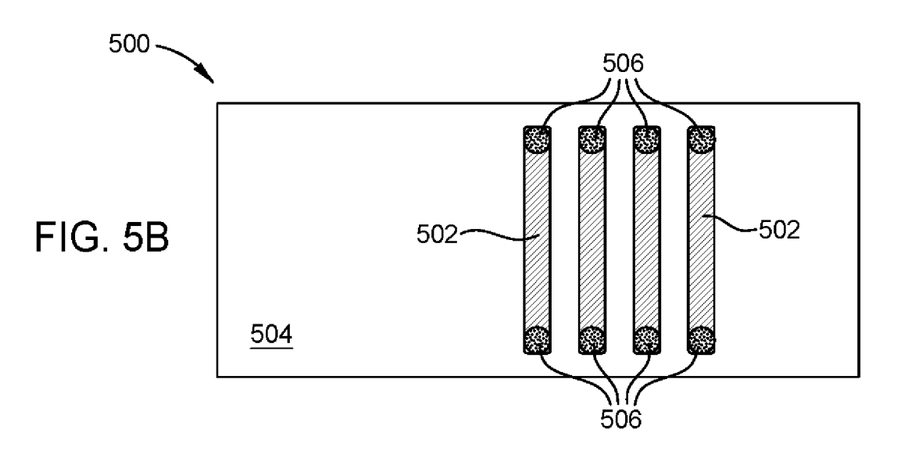

In operation 404, a first photoresist 506 is deposited over the ends 508 of each of the one or more bottom coil bars 502 for formation of a plurality of coil pillars, as shown in FIG. 5B.

Figure 5C:
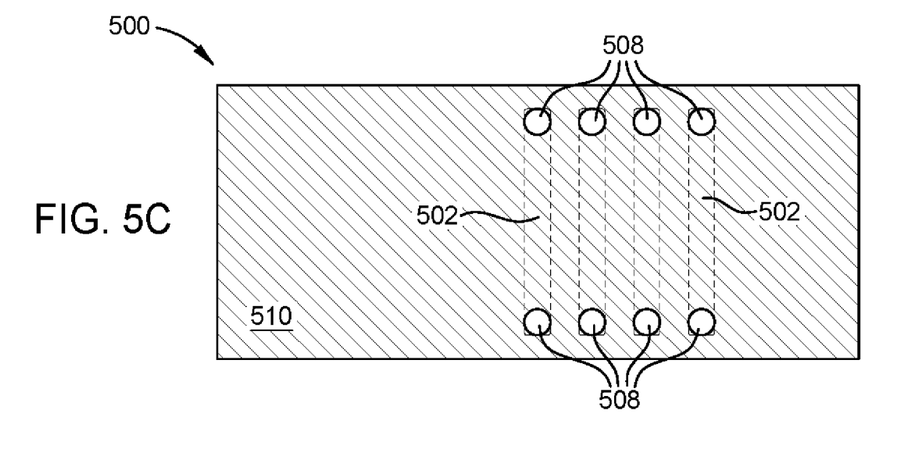

In operation 406, a first insulating layer 510, such as alumina, is deposited over the one or more bottom coil bars 502 and the substrate 504, and the first photoresist 506 is removed to expose the ends 508 of the bottom coil bars 502, as shown in FIG. 5C. The first insulating layer 510 insulates the bottom coil bars 502 to prevent shorting to the yoke. Alternatively, operations 404 and 406 may be combined by depositing the first insulating layer 510 over the bottom coil bars 502 and the substrate 504, deposit a photoresist over the bottom coil bars 502 and substrate 504, and etching the bottom coil bar ends 508 to expose the ends 508.

Figure 5D:
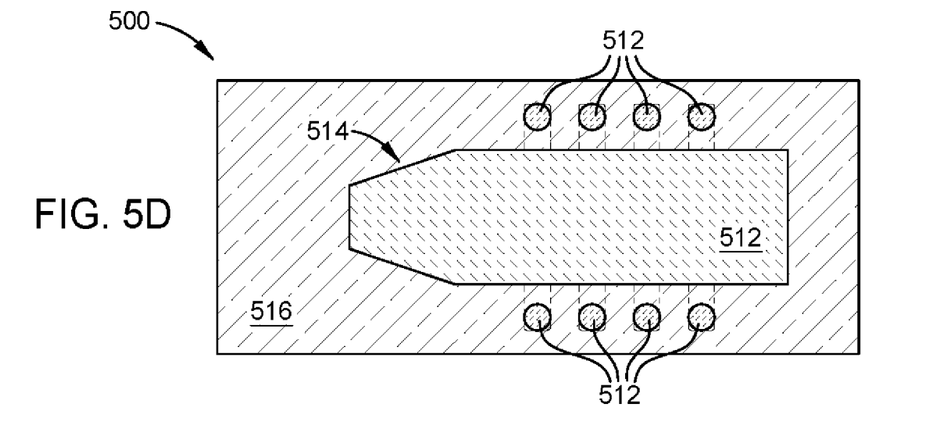

In operation 408, a seed layer 512 is deposited on the exposed coil bar ends 508 and over a central portion 514 of the first insulating layer 510 and the one or more bottom coil bars 502, and a second photoresist 516 is deposited over the first insulating layer 510, as shown in FIG. 5D. The seed layer 512 deposited over the central portion 514 of the first insulating layer 510 and the one or more bottom coil bars 502 will be the location where the yoke and main pole are formed.

Figure 5E:
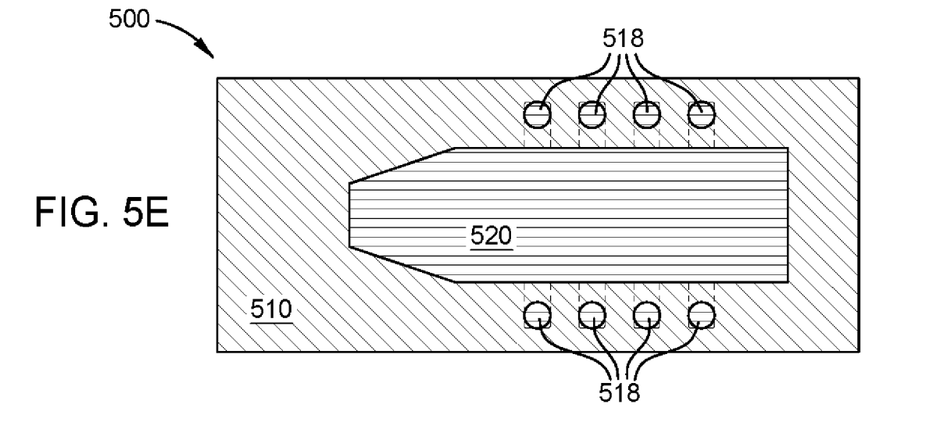

In operation 410, the yoke 520 and coil pillars 518 are formed, the seed layer 512 is removed, and the second photoresist 516 is removed, as shown in FIG. 5E. Forming the yoke 520 comprises forming the main pole. The coil pillars 518 form the second portions 308b of the first coil 308 or the second portions 358b of the second coil 358 of FIG. 3B. The coil pillars 518 may be connected to the yoke 520 (i.e., as flares coming off of the yoke 520). The yoke 520 and coil pillars 518 may comprise NiFe.

Figure 5F:
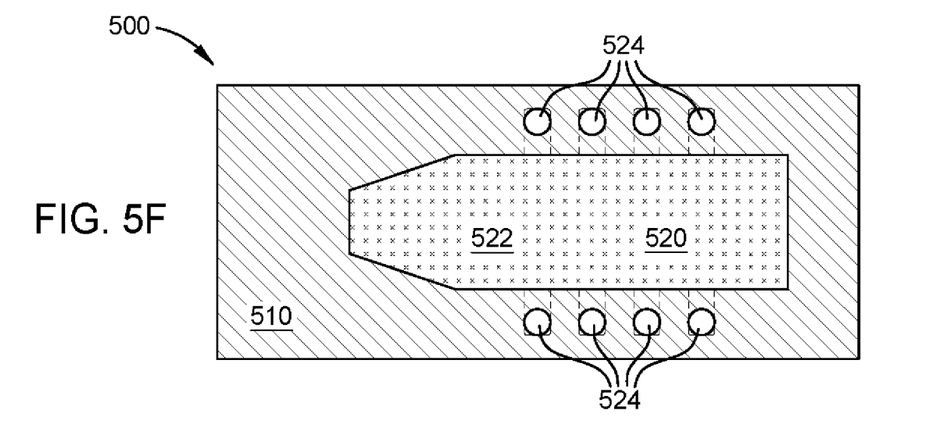

In operation 412, a second insulating layer 522, such as alumina, is deposited over the yoke 520 and coil pillars 518, and the top ends 524 of the coil pillars 518 are exposed using chemical mechanical planarization (CMP), as shown in FIG. 5F.

Figure 5G:
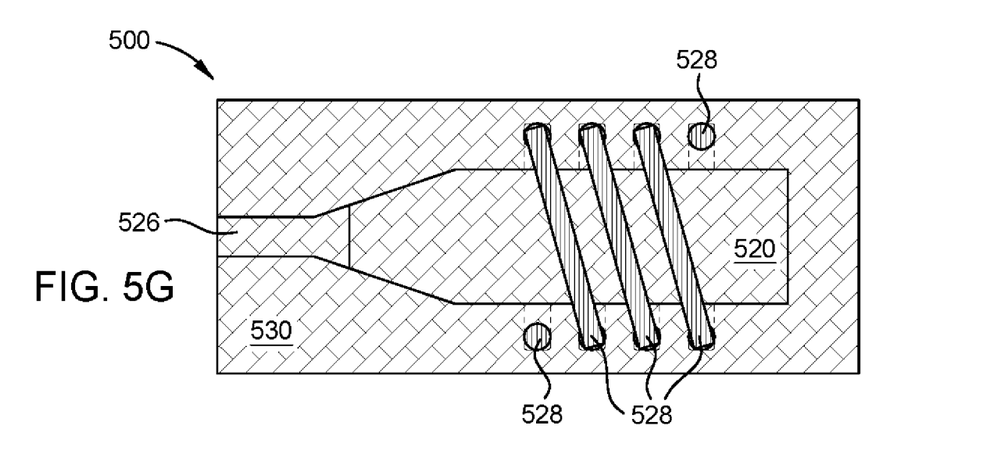

In operation 414, the write pole 526 is formed, a seed layer 528 is deposited for the formation of one or more top coil bars, and a third photoresist 530 is deposited over the yoke 520 around the seed layer 528, over the write pole 526, and over the first insulating layer 510, as shown in FIG. 5G.

Figure 5H:
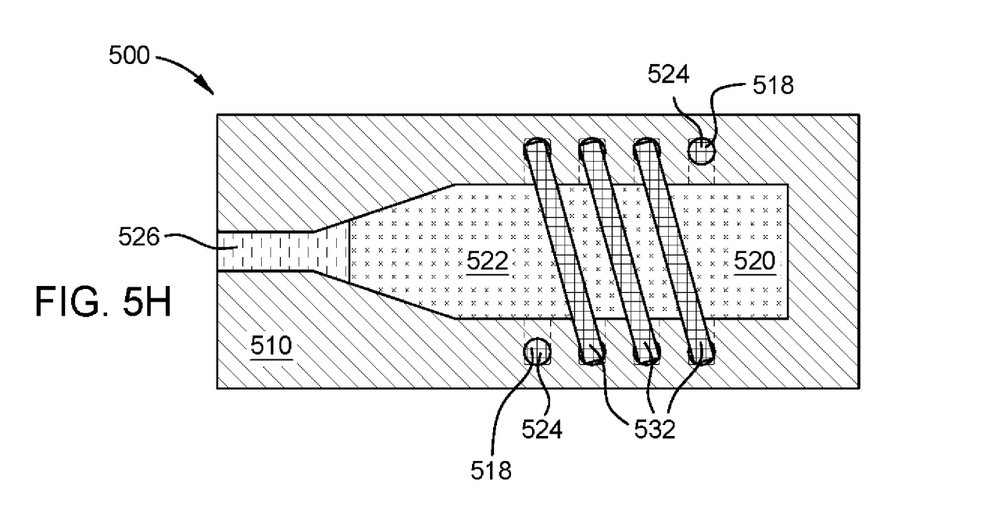

In operation 416, the seed layer 528 is removed, one or more top coil bars 532 are deposited to connect the top coil bars 532 to the coil pillars 518 and bottom coil bars 502 to complete the helical coil, and the third photoresist 530 is removed, as shown in FIG. 5H. The top coil bars 532 may be formed by copper plating. The top coil bars 532 comprise the same material as the bottom coil bars 502. The top coil bars 532 may form the top first portion 308a of the first coil 308 or the top first portion 358a of the second coil 358 of FIG. 3B.

Each top coil bar 532 is connected with two unaligned top ends 524 of the coil pillars 518 such that the top coil bars 532 are not parallel to the bottom coil bars 502. For example, the bottom coil bars 502 may be deposited along the y-axis while the top coil bars 532 are disposed at about a 30-60 degree angle to the bottom coil bars 502 and the y-axis. Two top coil bar ends 524 (i.e., the first and last ends 524) left unconnected to the top coil bars 532 are copper plated and used for a connection to contact pads to energize the helical coil.

A magnetic recording head having a first coil of a first write head wrapping around a first yoke of the first write head more times than the second coil of the second write head wraps around a second yoke of the second write allows the first write head to have a stronger write field and allows the second write head to have a higher data rate. As such, the first write head is optimized to increase a BPI capability of the magnetic recording head, and the second write head is optimized to increase a TPI capability of the magnetic recording head.

By utilizing a magnetic recording head comprising a first writing head configured to optimize the BPI and a second writing head configured to optimize the TPI, tracks of a media may be randomly written without limiting the SNR. Thus, the dual write head design discussed above has an increased areal density capacity (ADC), BPI, and TPI as compared to conventional magnetic recording heads comprising a single write head, resulting in both improved writes and reads of data on a media.

In one embodiment, a magnetic recording head comprises a first write head comprising a first main pole, a first yoke coupled to the first main pole, and a first coil wrapped around the first yoke, wherein each wrap of the first coil comprises first portions comprised of a first material and second portions comprised of a second material different than the first material. The magnetic recording head further comprises a second write head disposed adjacent to the first write head comprising a second main pole, a second yoke coupled to the second main pole, and a second coil wrapped around the second yoke, wherein each wrap of the second coil comprises first portions comprised of the first material and second portions comprised of the second material.

The first yoke and the second yoke each comprises the first material. The first yoke and the second yoke each has a rectangular shape, wherein a first surface and a second surface parallel to the first surface have a greater length than a third surface and a fourth surface parallel to the third surface. The first portions of the first coil are disposed on the third and fourth surfaces of the first yoke and the second portions of the first coil are disposed on the first and second surfaces of the first yoke, and wherein the first portions of the second coil are disposed on the third and fourth surfaces of the second yoke and the second portions of the second coil are disposed on the first and second surfaces of the second yoke.

The second write head has a higher data rate capability than the first write head, and wherein the first write head has a greater write field than the second write head. The first material is a non-magnetic electrically conductive material and the second material is a magnetic material. The first material comprises copper and the second material comprises nickel-iron alloy. The first yoke and the second yoke each comprises the non-magnetic electrically conductive material. The first coil wraps around the first yoke in the same direction as the second coil wraps around the second yoke. The first coil wraps around the first yoke in a different direction than the second coil wraps around the second yoke.

In another embodiment, a magnetic recording head comprises a first write head comprising a first main pole, a first yoke coupled to the first main pole, the first yoke having a first length, and a first coil wrapped around the first yoke, the first coil having a second length. The magnetic recording head further comprises a second write head disposed adjacent to the first write head comprising a second main pole, a second yoke coupled to the second main pole, the second yoke having a third length less than the first length of the first yoke, and a second coil, the second coil having a fourth length less than the second length of the first coil, wherein the first coil wraps around the first yoke a greater number of times than the second coil wraps around the second yoke.

The second write head has a higher data rate capability than the first write head, and wherein the first write head has a greater write field than the second write head. The first coil wraps around the first yoke in a clockwise direction or a counter-clockwise direction and the second coil wraps around the second yoke in the opposite direction. The first coil wraps around the first yoke in a clockwise direction or a counter-clockwise direction and the second coil wraps around the second yoke in the same direction. The first coil comprises first portions of a first non-magnetic material and second portions of a magnetic material different than the first material, wherein the second coil comprises first portions of the non-magnetic material and second portions of the magnetic material, and wherein the first yoke and the second yoke each comprises the magnetic material. The first write head is disposed adjacent to the second write head in a cross-the-track direction in a side-by-side formation. The first write head and the second write head are vertically stacked and disposed in a stacked formation.

In another embodiment, a magnetic recording head comprises one or more read heads, a first write head comprising means for increasing a bits per inch capability of the magnetic recording head and means for increasing a write field, and a second write head disposed adjacent to the first write head, the second write head comprising means for increasing a tracks per inch capability of the magnetic recording head and means for increasing a data rate capability. The first write head has a higher bit per inch capability and a greater write field than the second write head, and the second write head has a higher tracks per inch capability and a higher data rate capability than the first write head.

The first write head and the second write head are vertically stacked and disposed in a stacked formation. The first write head is disposed adjacent to the second write head in a cross-the-track direction in a side-by-side formation.

In yet another embodiment, a method of forming a write head comprises forming one or more bottom coil bars over a substrate, the one or more coil bars comprising a first material, depositing a first photoresist over ends of each of the one or more bottom coil bars for formation of a plurality of coil pillars, depositing a first insulating layer over the one or more bottom coil bars and the substrate, removing the first photoresist to expose the ends of each of the one or more bottom coil bars, forming a yoke over a central portion of the one or more bottom coil bars and form the plurality of coil pillars on the exposed ends of each of the one or more bottom coil bars, the plurality of coil pillars comprising a second material different than the first material, depositing a second insulating layer over the yoke and the plurality of coil pillars, removing portions of the second insulating layer to expose an end of each of the plurality of coil pillars, forming a write pole, and forming one or more top coil bars over the second insulating layer, the one or more top coil bars comprising the first material, wherein each top coil bar connects with a first exposed end of one coil pillar and a second exposed end of another coil pillar unaligned with the first exposed end, and wherein the one or more top coil bars are disposed at about a 30 to 60 degree angle from the one or more bottom coil bars.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a first write head, comprising:
a first main pole;
a first yoke coupled to the first main pole; and
a first coil wrapped around the first yoke, wherein each wrap of the first coil comprises first portions comprised of a first material and second portions comprised of a second material different than the first material; and
a second write head disposed adjacent to the first write head, comprising:
a second main pole;
a second yoke coupled to the second main pole; and
a second coil wrapped around the second yoke, wherein each wrap of the second coil comprises first portions comprised of the first material and second portions comprised of the second material, wherein the first material is a non-magnetic electrically conductive material and the second material is a magnetic material, and wherein the first yoke and the second yoke each comprises the non-magnetic electrically conductive material.

2. The magnetic recording head of claim 1, wherein the first yoke and the second yoke each has a rectangular shape, wherein a first surface and a second surface parallel to the first surface have a greater length than a third surface and a fourth surface parallel to the third surface.

3. The magnetic recording head of claim 2, wherein the first portions of the first coil are disposed directly adjacent to the third and fourth surfaces of the first yoke and the second portions of the first coil are disposed directly adjacent to the first and second surfaces of the first yoke, and wherein the first portions of the second coil are disposed directly adjacent to the third and fourth surfaces of the second yoke and the second portions of the second coil are disposed directly adjacent to the first and second surfaces of the second yoke.

4. The magnetic recording head of claim 1, wherein the second write head has a higher data rate capability than the first write head, and wherein the first write head has a greater write field than the second write head.

5. The magnetic recording head of claim 1, wherein the first material comprises copper and the second material comprises nickel-iron alloy.

6. The magnetic recording head of claim 1, wherein the first coil wraps around the first yoke in the same direction as the second coil wraps around the second yoke.

7. The magnetic recording head of claim 1, wherein the first coil wraps around the first yoke in a different direction than the second coil wraps around the second yoke.

8. The magnetic recording head of claim 1, wherein the first yoke has a first length, the first coil has a second length, the second yoke has a third length less than the first length of the first yoke, and the second coil has a fourth length less than the second length of the second coil.

9. A magnetic recording head, comprising:
a first write head, comprising:
a first main pole;
a first yoke coupled to the first main pole, the first yoke having a first length; and
a first coil wrapped around the first yoke, the first coil having a second length; and
a second write head disposed adjacent to the first write head, comprising:
a second main pole;
a second yoke coupled to the second main pole, the second yoke having a third length less than the first length of the first yoke; and
a second coil, the second coil having a fourth length less than the second length of the first coil, wherein the first coil wraps around the first yoke a greater number of times than the second coil wraps around the second yoke.

10. The magnetic recording head of claim 9, wherein the second write head has a higher data rate capability than the first write head, and wherein the first write head has a greater write field than the second write head.

11. The magnetic recording head of claim 9, wherein the first coil wraps around the first yoke in a clockwise direction or a counter-clockwise direction and the second coil wraps around the second yoke in the opposite direction.

12. The magnetic recording head of claim 9, wherein the first coil wraps around the first yoke in a clockwise direction or a counter-clockwise direction and the second coil wraps around the second yoke in the same direction.

13. The magnetic recording head of claim 9, wherein the first coil comprises first portions of a first non-magnetic material and second portions of a magnetic material different than the first material, wherein the second coil comprises first portions of the non-magnetic material and second portions of the magnetic material, and wherein the first yoke and the second yoke each comprise the non-magnetic material.

14. The magnetic recording head of claim 9, wherein the first write head is disposed adjacent to the second write head in a cross-the-track direction in a side-by-side formation.

15. The magnetic recording head of claim 9, wherein the first write head and the second write head are vertically stacked and disposed in a stacked formation.

16. The magnetic recording head of claim 15, wherein the first write head and the second write head are vertically stacked and disposed in a stacked formation.

17. The magnetic recording head of claim 15, wherein the first write head is disposed adjacent to the second write head in a cross-the-track direction in a side-by-side formation.

18. A magnetic recording head, comprising:
one or more read heads;
a first write head comprising means for increasing a bits per inch capability of the magnetic recording head and means for increasing a write field; and
a second write head disposed adjacent to the first write head, the second write head comprising means for increasing a tracks per inch capability of the magnetic recording head and means for increasing a data rate capability, wherein the first write head has a higher bit per inch capability and a greater write field than the second write head, and wherein the second write head has a higher tracks per inch capability and a higher data rate capability than the first write head.

19. A magnetic recording head, comprising:
a first write head, comprising:
a first main pole;
a first yoke coupled to the first main pole; and
a first coil wrapped around the first yoke, wherein each wrap of the first coil comprises first portions comprised of a first material and second portions comprised of a second material different than the first material; and a second write head disposed adjacent to the first write head, comprising:
  a second main pole;
  a second yoke coupled to the second main pole; and
  a second coil wrapped around the second yoke, wherein each wrap of the second coil comprises first portions comprised of the first material and second portions comprised of the second material;

wherein:
  the first yoke and the second yoke each have a rectangular shape and comprise a first surface, a second surface parallel to the first surface, a third surface, and a fourth surface parallel to the third surface, the first and second surfaces having a greater length than the third and fourth surfaces;
  the first portions of the first coil are disposed directly adjacent to the third and fourth surfaces of the first yoke and the second portions of the first coil are disposed directly adjacent to the first and second surfaces of the first yoke; and
  the first portions of the second coil are disposed directly adjacent to the third and fourth surfaces of the second yoke and the second portions of the second coil are disposed directly adjacent to the first and second surfaces of the second yoke.

20. The magnetic recording head of claim 19, wherein the second write head has a higher data rate capability than the first write head, wherein the first write head has a greater write field than the second write head, and wherein the first material is a non-magnetic electrically conductive material and the second material is a magnetic material.

21. The magnetic recording head of claim 19, wherein the first coil wraps around the first yoke in a clockwise direction or a counter-clockwise direction and the second coil wraps around the second yoke in the opposite direction.

22. The magnetic recording head of claim 19, wherein the first coil wraps around the first yoke in a clockwise direction or a counter-clockwise direction and the second coil wraps around the second yoke in the same direction.

23. The magnetic recording head of claim 19, wherein the first material comprises copper and the second material comprises nickel-iron alloy.

24. The magnetic recording head of claim 19, wherein the first yoke and the second yoke each comprises the first material, the first material being different than the second material, and wherein the first yoke has a first length, the first coil has a second length, the second yoke has a third length less than the first length of the first yoke, and the second coil has a fourth length less than the second length of the second coil.

* * * * *